Feb. 23, 1965   J. SAWARD   3,170,713
PERAMBULATOR WITH ANTI-TILTING STAND AND BRAKE
Filed March 15, 1963   2 Sheets-Sheet 1
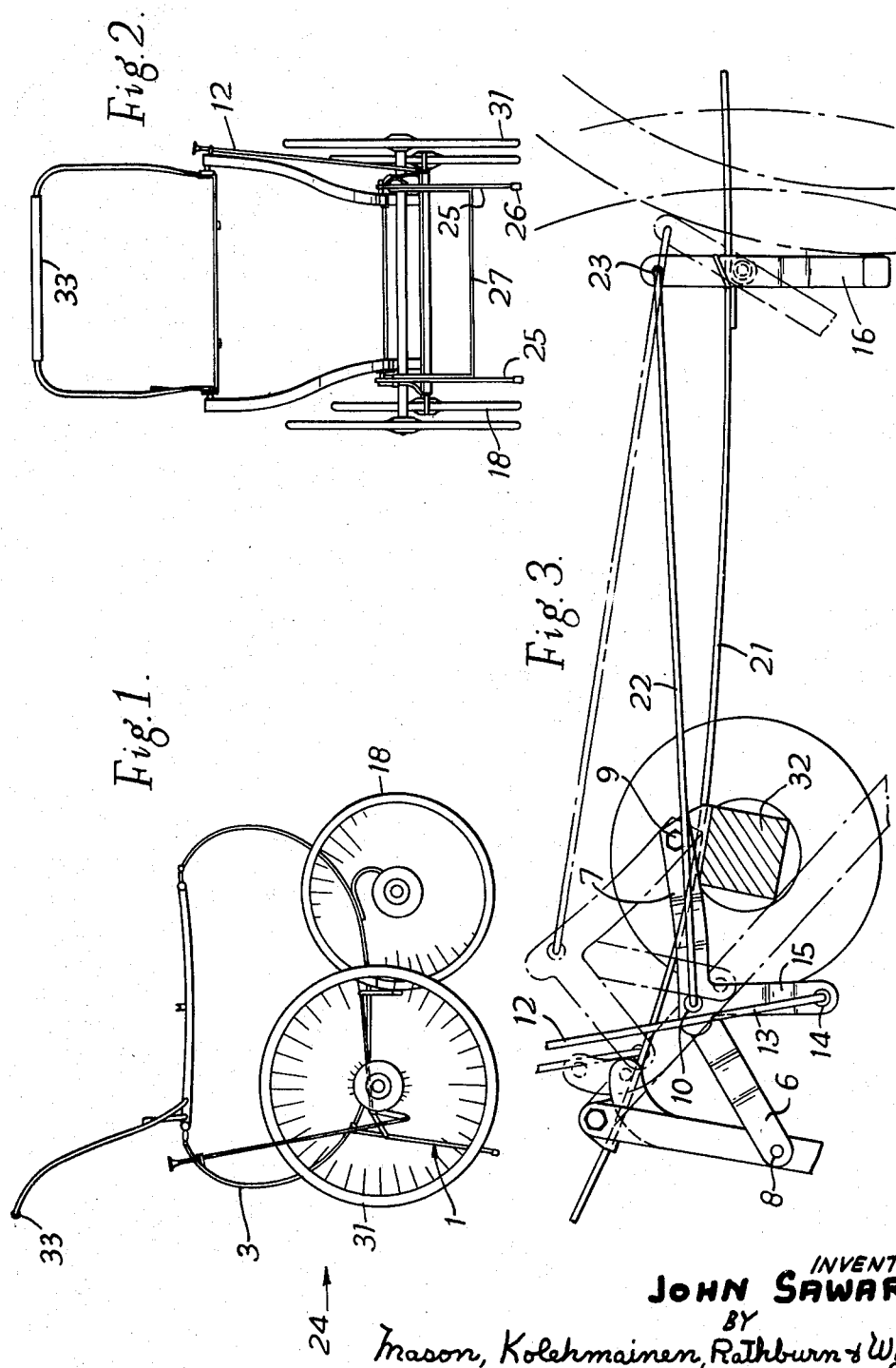
INVENTOR
JOHN SAWARD
BY
Mason, Kolehmainen, Rathburn & Wyss
ATTORNEYS Feb. 23, 1965  J. SAWARD  3,170,713
PERAMBULATOR WITH ANTI-TILTING STAND AND BRAKE
Filed March 15, 1963  2 Sheets-Sheet 2

INVENTOR
JOHN SAWARD
BY
Mason, Kolehmainen, Rathburn & Wyss
ATTORNEYS

United States Patent Office 3,170,713
Patented Feb. 23, 1965

3,170,713
PERAMBULATOR WITH ANTI-TILTING STAND
AND BRAKE
John Saward, Beckenham, Kent, England, assignor to
Royale Baby Carriages Limited, London, England
Filed Mar. 15, 1963, Ser. No. 265,479
Claims priority, application Great Britain, Jan. 22, 1963,
2,795/63
1 Claim. (Cl. 280—150)

This invention relates to perambulators and is concerned with the provision of an anti-tilting device on a perambulator and with perambulators fitted with such devices.

A baby or child carried in a perambulator may shift its position so that its weight acts in a plane behind the rear wheels of the perambulator. Alternatively, or at the same time, a heavy shopping basket may be attached to the perambulator so that the perambulator is weighted behind the rear wheel axis. In either case a load is applied which acts to tilt the perambulator in an anti-clockwise direction around its rear wheels.

It is an object of my invention to provide a device for use on a perambulator which resists such tilting action.

The anti-tilting device of my invention consists of, or includes, a stand member which is pivoted to the perambulator frame at a location to the rearward of the axis for the rear wheels of the perambulator the geared member is movable between an inoperative position in which it is free from contact with the surface on which the rear wheels lie and an operative position in which the stand member is in contact with the surface and is rearwardly inclined towards the surface.

According to a feature of my invention, the stand member is two-legged, and the legs are separately pivoted to longitudinal frame members forming part of the perambulator chassis. In its inoperative position, the stand member is preferably pivoted forward so that its feet are lifted clear from the ground.

According to another feature of my invention, the stand member is connected to the chassis by means of a link assembly which assists in holding the stand member in its operative position with its feet in contact with the ground.

The effect of the stand member in its operative position is to resist any tilting of the perambulator in an anti-clockwise direction around its rear wheels. This anti-tilting device is of considerable advantage when the person using the perambulator loads the perambulator in such a way that an undue weight is exerted on the perambulator body in a direction extending behind the axis of the rear wheels so as to have a rearward tilting effect on the perambulator.

According to a particular feature of my invention, the stand member is combined with a brake for the perambulator in such a way that the stand member is brought into its operative position when the brake is engaged, and is returned to its inoperative position when the brake is disengaged. A particularly convenient combination is to have a downwardly extending brake stem for operating the brake by hand which is attached at its lower end to the stand member itself or to a link between the stand member and the perambulator chassis.

According to a particularly convenient embodiment of my invention, the stand member is linked to the chassis of the perambulator by means of a toggle assembly to which the brake stem is attached. The toggle assembly is brought to its extended position when the brake is engaged and in so doing brings the stand member to its operative position.

For a better understanding of my invention reference is now made to the accompanying diagrammatic drawings, in which:

FIGURE 1 is highly schematic side-elevation of a perambulator fitted with a hand brake and with one constructural form of anti-tilting device in accordance with my invention;

FIGURE 2 is an end view corresponding to FIGURE 1;

FIGURE 3 is an enlarged side-elevation of part of the anti-tilting device shown in FIGURES 1 and 2;

The perambulator diagrammatically indicated in FIGURES 1 and 2 is of conventional construction and no attempt will be made to describe this conventional construction in detail since it is believed that it will be well understood by the instructed reader.

Figure 4:
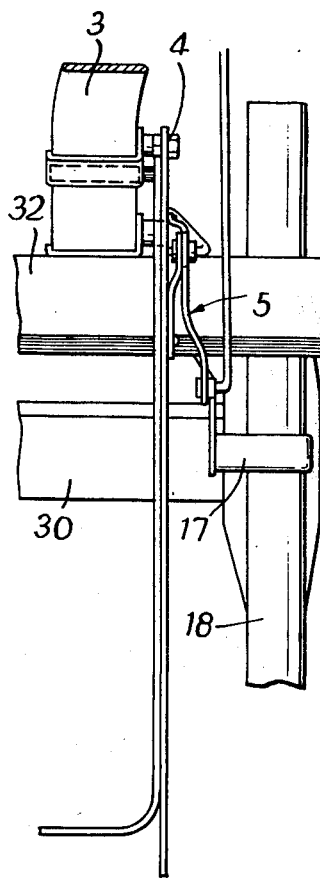
FIGURE 4 is a fragmentary end view corresponding to FIGURE 1.
Figure 5:
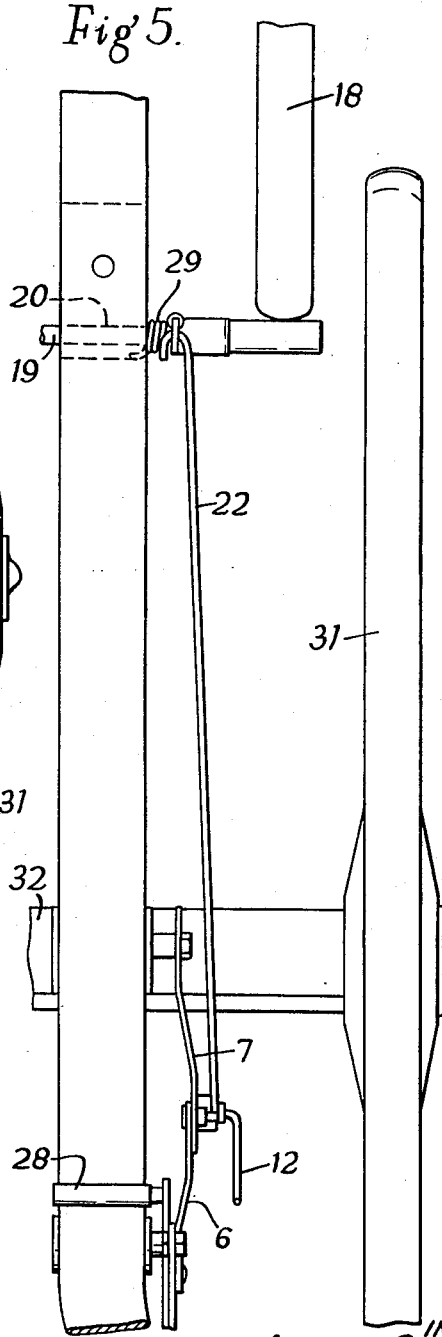
FIGURE 5 is a fragmentary plan view corresponding to FIGURES 3 and 4.

The anti-tilting device generally indicated at 1 in FIGURES 1 and 2, and shown in greater detail in FIGURES 3 to 5, includes a stand member 2 attached to the perambulator chassis 3 by means of a pivot 4. An assembly 5 of toggle links 6 and 7 is attached to the stand member 2 by means of a pivot 8 and to the chassis 3 by means of a pivot 9. The link 7, which is of bell-crank shape, is linked intermediate its ends to the link 6 by means of a free pivot 10.

A brake 11 is manually operated by an upright brake stem 12 whose lower end 13 is pivotally attached at 14 to the lower end of the downwardly extending arm 15 of the bell-crank link 7.

Brake feet 16, provided with rubber pads 17 at their operative lower ends are arranged to act upon the front wheels 18 of the perambulator. The brake feet 16 are fixed to the ends of a horizontal brake rod 19 journalled at 20 below strips 21 which constitute the longitudinal frame members of the perambulator chassis 3. The brake rod 19, with its brake feet 16, is pivotable by means of a brake link 22 connecting the free pivot 10 of the toggle links 6 and 7 to a free pivot 23 at the top of the right-hand brake foot 16 looking in the direction of the arrow 24 in FIGURE 1.

The stand member 1 has a pair of legs 25 with rubber feet 26. The legs 25 are linked by means of a reinforcing strip member 27 in the form of an inverted hoop of substantially rectangular outline, which is riveted to the legs 25. The upper ends of the reinforcing member 27 are provided with rubber-covered stop members 28 which abut against the upper surfaces of the longitudinal frame members 21 when the stand member 2 is in its operative position, preventing the rearward tilting of the perambulator.

Coiled tension springs 29 are connected between the brake feet 16 and the adjacent strip members 21 so as to provide a slight biasing of the brake feet towards their disengaged position. This cooperates with the extrusion of the toggle device 5 to lock the stand member 2 in its operative position when the brake 11 is engaged.

The front wheels 18 are rotatably mounted at the ends of a horizontal wheel axle 30 and the rear wheels 31 are rotatably mounted at the ends of a horizontal wheel axle 32.

The anti-tilting device 1 described above operates as follows. In the disengaged position of the brake 11, the feet 26 of the stand member 2 are tilted upwards and forwardly so as to be clear of the ground, thereby allowing free movement of the perambulator along the ground. When the brake 11 is engaged by manual depression of the brake stem 12, the stand feet 26 are rearwardly pivoted and, with slight lifting of the perambulator handle 33, they are brought to a position in which the legs 25 of the stand member 2 are rearwardly inclined in the direction towards the feet 26. At the same time, the downward movement of the pivot 14 pulls the free pivot 10 downwardly and causes the extension of the toggle assembly 5. The engagement of the brake and the extension of the assembly 5 together ensure positive locking of the anti-tilting device 1 in its operative position.

Any tendency towards rearward tilting of the perambulator, for instance when a child is sitting in the rear part of the perambulator or a heavy shopping basket is carried by the perambulator near the handle 33 is resisted by the contact between the feet 26 of the stand member 2 and the ground. It should be noted that the stop members 28 provide further locking of the stand member 2 when it is in its operative position.

It should also be appreciated that, although the combination of the brake and the anti-locking device as indicated above is believed to be the most effective embodiment of my invention, it is possible to separate the brake 11 and the anti-tilting device 1, for instance by avoiding any link between the brake 11 and the stand member 2 or by providing independent actuating means for the anti-tilting device. This latter possibility will, however, involve a certain amount of duplication and is therefore a less advantageous embodiment of my invention.

I claim:

In a perambulator comprising a body, a chassis frame supporting the body and front and rear wheels rotatably mounted on the said chassis frame, the combination of a stand member pivotally mounted on said chassis frame at a location to the rearward of the axis for said rear wheels and movable between a forward inoperative position in which said stand member is lifted clear from the surface on which the perambulator wheels lie, whereby movement of the perambulator is unimpeded by said member, and a nearly upright operative position in which said stand member is rearwardly inclined to the vertical from its upper to its lower end, said lower end then contacting said surface, whereby tilting of the perambulator in an anti-clockwise direction around its rear wheels is resisted, a pair of toggle levers constituting a toggle assembly with retracted and extended conditions, one lever in said toggle assembly pivotally connected to said chassis, the other lever in said assembly pivotally connected to the said stand member, and a free pivot connecting the levers together, said assembly being adapted to actuate said stand member between its inoperative and operative positions, and to assist in holding said stand member in its operative position, corresponding to the extended condition of said assembly, a brake assembly, at least one brake member in said brake assembly which is engageable and disengageable from a front wheel of the perambulator, at least one brake link in said brake assembly pivotally connected between said toggle assembly and said brake member, one end of said brake link constituting said free pivot, whereby said brake member is actuatable by movement of said toggle assembly between retracted and extended positions, and a manually operable brake rod in said brake assembly connected to said one lever to thereby simultaneously actuate said brake member and said stand member via said toggle assembly.

References Cited in the file of this patent

UNITED STATES PATENTS

| | | |
|---|---|---|
| 1,715,555 | Jackson | June 4, 1929 |
| 1,824,484 | Jackson | Sept. 22, 1931 |
| 2,014,085 | Kroll | Sept. 10, 1935 |

FOREIGN PATENTS

| | | |
|---|---|---|
| 215,558 | Great Britain | May 15, 1924 |